S. E. CHAPMAN.
VEHICLE WHEEL.
APPLICATION FILED JULY 24, 1909.
994,571.
Patented June 6, 1911.
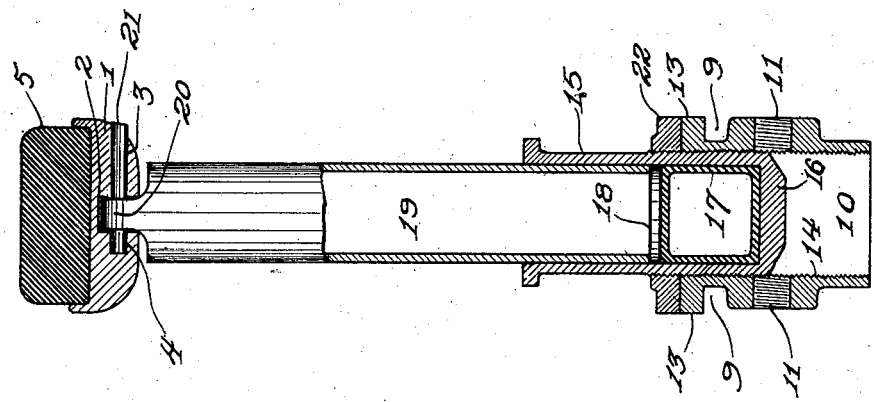
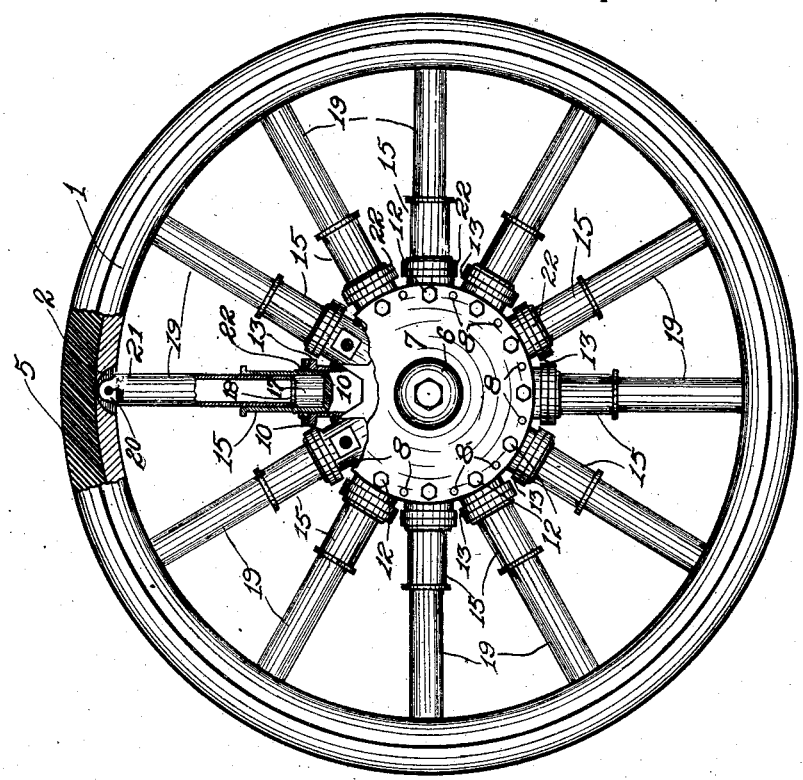
WITNESSES:
J. D. McLaughlin
H. C. Schroeder
INVENTOR
SAMUEL E. CHAPMAN
BY
E. E. Vrooman
ATTORNEY

UNITED STATES PATENT OFFICE.

SAMUEL E. CHAPMAN, OF OAKLAND, CALIFORNIA, ASSIGNOR OF ONE-THIRD TO WILLIAM M. WOODWARD, OF OAKLAND, CALIFORNIA.

VEHICLE-WHEEL.

994,571.     Specification of Letters Patent.    Patented June 6, 1911.

Application filed July 24, 1909. Serial No. 509,353.

*To all whom it may concern:*

Be it known that I, SAMUEL E. CHAPMAN, citizen of the United States, residing at Oakland, in the county of Alameda and State of California, have invented certain new and useful Improvements in Vehicle-Wheels, of which the following is a specification, reference being had therein to the accompanying drawing.

This invention relates to vehicle wheels and the principal object of the same is to provide a novel type of spoke therefor combined with a cushioning hub through the medium of which the usual cushioning inflatable tire may be dispensed with.

In carrying out the objects of the invention generally stated above, it will, of course, be understood that the essential features of the same are susceptible of changes in details and structural arrangements, but a preferred and practical embodiment thereof is shown in the accompanying drawings wherein—

Figure 1 is a view in side elevation of the improved wheel, shown partly in section. Fig. 2 is a detail vertical sectional view showing a part of the hub and one of the spokes.

Referring to said drawings by numerals, 1 designates the rim of the improved wheel the inner face of which is provided with regularly spaced cavities 2 which are intersected by a transverse opening 3 extending through one side of said rim, said cavities being also provided with transverse recesses 4 which aline with said openings 3. The rim is provided with a cushion or other tire 5.

The hub 6 is provided with a pair of plates 7 which are retained in spaced relation in said hub by means of the connecting bolts 8 which pass through side notches 9 of sockets 10. Said sockets 10 are provided with transversely extending threaded openings 11 which are engaged by bolts 12 carried by said plates. Said sockets have their outer ends enlarged and provided with a flat outer bearing surface 13 and are interiorly threaded as indicated at 14 for the receipt of externally threaded cylinders 15, the inner ends 16 of which are closed. An air bag 17, preferably sealed, is located in said cylinder 15, the outer surface of said bag being provided with a bearing plate 18 upon which the inner end of a hollow spoke 19 is mounted. The outer end of said spoke is reduced and shaped to provide a pivot ear 20 adapted to be fitted within one of the cavities 2 of the rim and held in pivotal engagement therewith by means of a pivot pin 21 preferably tapering, which is driven through the opening 3 of said rim, the pivot ear 20 and into the recess 4. A lock nut 22 is provided for each cylinder 15 which is adapted to be secured onto said cylinder and brought into binding engagement with the flat bearing surface 13 of the socket 10.

It will be seen from the foregoing that the shocks and jars incidental to the rotation of the improved wheel will cause the spokes to slide in their cylinders and compress the bag 17 and thereby absorb said shocks and jars. Also through the described bolt and screw connection of the sockets with the hub plates, and the pivotal connection of the spokes with the rim, that said sockets will have a limited rocking movement which will compensate for the weight of the load carried by the vehicle which the improved wheels are supporting.

Another prominent feature of the invention is in the manner of connecting the parts of the improved wheel so that the same may be readily disassembled for the purpose of repair, replacement, or cleaning. It will be seen that by releasing the nuts which hold the cylinders and sockets in engagement, said cylinders may be screwed down into said sockets far enough to permit the spokes to be forced into said cylinder so that their outer ends will clear their cavities after they have been released from the rim so that the spokes may be readily removed. After the spokes have been removed, the cylinders may be unscrewed from the sockets, and the sockets disengaged from the plates by removing the screws and bolts.

What I claim as my invention is:—

A wheel comprising a rim, a hub, plates carried by said hub, sockets fitted between said plates and provided with slots and threaded openings, bolts connecting said plates and passing through said slots, screws carried by said plates and engaging said threaded openings, a cushioning cylinder carried by each socket, and a spoke slidably mounted in each cylinder and pivotally connected to said rim.

In testimony whereof I, hereunto affix my signature in presence of two witnesses.

SAMUEL E. CHAPMAN.

Witnesses:
H. C. SCHROEDER,
F. P. SCHROEDER.

Copies of this patent may be obtained for five cents each, by addressing the "Commissioner of Patents, Washington, D. C."